(12) United States Patent
Son

(10) Patent No.: US 11,424,996 B2
(45) Date of Patent: Aug. 23, 2022

(54) METHOD FOR CONTROLLING DISPLAY DEVICE, AND DISPLAY DEVICE ACCORDING THERETO

(71) Applicant: SAMSUNG ELECTRONICS CO., LTD., Suwon-si (KR)

(72) Inventor: Hoyong Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/297,304

(22) PCT Filed: Nov. 25, 2019

(86) PCT No.: PCT/KR2019/016267
§ 371 (c)(1),
(2) Date: May 26, 2021

(87) PCT Pub. No.: WO2020/111692
PCT Pub. Date: Jun. 4, 2020

(65) Prior Publication Data
US 2022/0029893 A1    Jan. 27, 2022

(30) Foreign Application Priority Data
Nov. 27, 2018 (KR) .......................... 10-2018-0148778

(51) Int. Cl.
*G06F 3/0482* (2013.01)
*H04L 41/22* (2022.01)

(52) U.S. Cl.
CPC ............ *H04L 41/22* (2013.01); *G06F 3/0482* (2013.01)

(58) Field of Classification Search
CPC ................................................. G06F 3/048–05
See application file for complete search history.

(56) References Cited

U.S. PATENT DOCUMENTS

| 7,797,642 B1 * | 9/2010 | Karam ................. G06Q 10/107 715/764 |
| 8,098,677 B1 * | 1/2012 | Pleshek ................. H04L 43/028 715/740 |

(Continued)

FOREIGN PATENT DOCUMENTS

| KR | 10-2006-0028853 A | 4/2006 |
| KR | 10-2015-0047325 A | 5/2015 |

(Continued)

OTHER PUBLICATIONS

Communication dated Mar. 5, 2020 issued by the International Searching Authority in counterpart English Application No. PCT/KR2019/016267 (PCT/ISA/220, PCT/ISA/210, and PCT/ISA/237).

*Primary Examiner* — Daniel Rodriguez
(74) *Attorney, Agent, or Firm* — Sughrue Mion, PLLC

(57) ABSTRACT

A display device according to an embodiment of the present disclosure includes: a display; a communication unit configured to communicate with at least one other display device; a memory storing one or more instructions; and a control unit including at least one processor configured to perform at least one of the one or more instructions. According to an embodiment of the present disclosure, provided are a display device capable of selectively blocking outbound traffic generated in the display device and generally applying the blocking of outbound traffic to a plurality of display devices and a method for configuring the display device.

13 Claims, 11 Drawing Sheets

(56) References Cited

U.S. PATENT DOCUMENTS

| | | |
|---|---|---|
| 8,531,693 B2 | 9/2013 | Reddy et al. |
| 9,166,984 B2 * | 10/2015 | Davis ................... H04L 63/102 |
| 10,412,048 B2 | 9/2019 | Glazemakers et al. |
| 2006/0068806 A1 * | 3/2006 | Nam ...................... H04L 67/104 |
| | | 455/452.2 |
| 2007/0019796 A1 * | 1/2007 | Dassow .................. H04M 3/38 |
| | | 379/114.14 |
| 2007/0039037 A1 * | 2/2007 | Son .......................... H04L 63/20 |
| | | 340/5.1 |
| 2008/0186971 A1 * | 8/2008 | Carmichael ............... A61P 9/10 |
| | | 370/392 |
| 2009/0119750 A1 * | 5/2009 | Sembugamoorthy ....................... |
| | | H04L 63/1416 |
| | | 726/3 |
| 2009/0154348 A1 * | 6/2009 | Newman ............... H04L 63/101 |
| | | 370/230 |
| 2009/0193102 A1 * | 7/2009 | Trujillo ............... H04L 41/0856 |
| | | 709/220 |
| 2009/0287705 A1 * | 11/2009 | Schneider ............. G06F 16/958 |
| | | 707/999.009 |
| 2010/0037309 A1 * | 2/2010 | Dargis .................. H04L 63/164 |
| | | 726/13 |
| 2010/0251348 A1 * | 9/2010 | Verma ................... H04L 9/3263 |
| | | 726/3 |
| 2012/0197980 A1 * | 8/2012 | Terleski .................. H04L 51/32 |
| | | 709/203 |
| 2013/0288601 A1 * | 10/2013 | Chhabra ................. H04L 63/18 |
| | | 455/41.2 |
| 2014/0032591 A1 * | 1/2014 | Li ....................... H04L 63/0236 |
| | | 707/769 |
| 2015/0067815 A1 * | 3/2015 | Overcash ............. H04L 63/101 |
| | | 726/11 |
| 2016/0253930 A1 * | 9/2016 | Lee ....................... G09F 9/3026 |
| | | 345/1.3 |
| 2017/0099347 A1 * | 4/2017 | Pucha .................. H04L 63/101 |
| 2017/0366505 A1 * | 12/2017 | Wright .................. H04L 47/20 |
| 2018/0139645 A1 | 5/2018 | Yu et al. |
| 2018/0349502 A1 * | 12/2018 | Maycock ......... G06F 16/24578 |
| 2019/0014208 A1 * | 1/2019 | Fiorini .................... H04M 3/42 |
| 2019/0339823 A1 * | 11/2019 | Shaffer ................ G06F 3/0482 |

FOREIGN PATENT DOCUMENTS

| | | |
|---|---|---|
| KR | 10-1686703 B1 | 12/2016 |
| KR | 10-2018-0055273 A | 5/2018 |
| KR | 10-2018-0110676 A | 10/2018 |

* cited by examiner

METHOD FOR CONTROLLING DISPLAY DEVICE, AND DISPLAY DEVICE ACCORDING THERETO

TECHNICAL FIELD

Embodiments of the present disclosure relate to a method for controlling a display device, and a display device according thereto.

Particularly, the disclosed embodiments relate to a display device for controlling outbound traffic and a method for controlling the outbound traffic of the display device.

BACKGROUND ART

Display devices have a function of displaying a video which a user can view. For example, past display devices had only a function of mainly receiving a broadcast signal transmitted from a broadcasting station only in one direction and displaying a broadcast video. However, current display devices provide a function capable of outputting not only a broadcast video received from a broadcasting station but also various pieces of video content.

In addition, according to the development of display devices, display devices are used not only in houses but also in a video wall or the like for transferring advertisements and guidance information in police stations, fire stations, the meteorological administration, situation control rooms of military camps and the like, shopping mall lobbies, and the like.

The display devices used to transfer advertisements and guidance information as described above may include, for example, large format display (LFD) devices having a larger size than general display devices and commercially used to mainly play advertisement content. The LFD devices may be used in a video wall or the like for transferring advertisements and guidance information in shopping mall lobbies and the like to play advertisement content and the like. Generally, a video wall or the like includes a plurality of same LFD devices. Hereinafter, such an LFD device is referred to as a 'display device'.

Such a plurality of display devices are mainly used by a single sponsor, and according to a conventional method for controlling a display device, there is inconvenience in that outbound traffic should be individually controlled for each display device. Herein, the outbound traffic indicates traffic generated when a display device requests desired information from an external server or a host connected through a network. For example, even when a display device transmits a synchronization request for time information to an external server to synchronize a time of the display device with that of the external server, outbound traffic may be generated.

As such, along with the recent development of communication technology, there have been various types of outbound traffic to be transmitted from a display device, and outbound traffic, which is not intended by a user, may be automatically generated.

Accordingly, there is demand for providing a method and apparatus capable of controlling outbound traffic, which can be generated in a display device, according to an intention of a user.

DESCRIPTION OF EMBODIMENTS

Technical Problem

The disclosed embodiments provide a display device capable of increasing convenience of a user and a method of controlling the display device.

Particularly, the disclosed embodiments provide a display device capable of controlling at least a portion of outbound traffic, which is generated in the display device, according to an intention of a user and a method of controlling the display device.

Particularly, the disclosed embodiments provide a display device capable of selectively blocking outbound traffic generated in the display device and applying the blocking of outbound traffic to at least one other display device in the same manner and a method for configuring the display device.

Solution to Problem

According to an embodiment of the present disclosure, there is provided a display device including: a display; a communication unit configured to communicate with at least one other display device; a memory storing one or more instructions; and a control unit including at least one processor configured to perform at least one of the one or more instructions, wherein the processor is further configured to acquire first information corresponding to outbound traffic to be transmitted from the communication unit, block outbound traffic corresponding to second information including at least a portion of the first information, and display a first user interface for selecting whether to block outbound traffic of the at least one other display device in the same manner as the display device by transmitting the second information to the at least one other display device through the communication unit.

Therefore, the display device may control outbound traffic to control outbound traffic of the at least one other display device in the same manner as the display device, thereby increasing user convenience and efficiency.

In addition, the first information may include a list including at least one of a destination Internet protocol (IP) address, a uniform resource locator (URL), or a media access control (MAC) address related to outbound traffic to be transmitted when the processor requests predetermined information from at least one external server connected to a network.

In addition, the processor may be further configured to display the list included in the first information and display a second user interface for selecting an item to be blocked from the list and generating the second information.

Therefore, the display device may receive an input related to outbound traffic to be blocked from the user, so that the user may easily select outbound traffic to be blocked.

In addition, the processor may be further configured to block at least a portion of outbound traffic to be transmitted from the display device by adding the outbound traffic corresponding to the second information to a block list, wherein the block list includes at least one of a destination IP, a URL, or a MAC address related to the outbound traffic corresponding to the second information.

Therefore, the display device may control outbound traffic to control outbound traffic of the at least one other display device in the same manner as the display device, thereby increasing user convenience and efficiency.

In addition, the processor may be further configured to transmit the second information to the at least one other display device by using at least one of a broadcast scheme, a multicast scheme, or a scheme of communicating with the at least one other display device connected to an access point (AP) in a network.

Therefore, because communication may be performed with the at least one other display device connected to the AP in the network besides the broadcast scheme and the multicast scheme, information may be easily transmitted to a display device existing within a short distance.

In addition, the processor may be further configured to perform a control so that deblocking is performed by deleting predetermined information corresponding to outbound traffic included in a block list of the display device while the second information cannot be transmitted to the at least one other display device because outbound traffic of the display device is blocked.

Therefore, even when outbound traffic blocking of the at least one other display device cannot be performed because outbound traffic of the display device is blocked, deblocking may be performed for a predetermined time to control outbound traffic of the at least one other display device.

In addition, the processor may be further configured to, when third information for blocking outbound traffic of the display device in the same manner as the at least one other display device is received, add outbound traffic corresponding to the third information to a block list of the display device and control outbound traffic to be blocked based on the block list.

Therefore, the display device may control outbound traffic of the at least one other display device, and outbound traffic of the display device may also be controlled by the at least one other display device, thereby increasing user convenience and efficiency.

In addition, the processor may be further configured to control the third information to be transmitted to at least one other different display device.

Therefore, the display device may transmit a request transmitted from the at least one other display device to the at least one other different display device, thereby generally controlling a plurality of display devices.

According to another embodiment of the present disclosure, there is provided a method for controlling a display device capable of communicating with at least one other display device connected to a network, the method including: acquiring first information corresponding to outbound traffic to be transmitted from a communication unit; blocking outbound traffic corresponding to second information including at least a portion of the first information; and blocking outbound traffic of the at least one other display device in the same manner as the display device by transmitting the second information to the at least one other display device through the communication unit.

In addition, the first information may include a list including at least one of a destination Internet protocol (IP) address, a uniform resource locator (URL), or a media access control (MAC) address related to outbound traffic to be transmitted when requesting predetermined information from at least one external server connected to the network.

In addition, the blocking may include displaying the list included in the first information, and displaying a second user interface for selecting an item to be blocked from the list and generating the second information.

In addition, the blocking may include blocking at least a portion of outbound traffic to be transmitted from the display device by adding the outbound traffic corresponding to the second information to a block list, wherein the block list includes at least one of a destination IP, a URL, or a MAC address related to the outbound traffic corresponding to the second information.

In addition, the blocking may include transmitting the second information to the at least one other display device by using at least one of a broadcast scheme, a multicast scheme, or a scheme of communicating with the at least one other display device connected to an access point (AP) in the network.

In addition, the method may further include performing control so that deblocking is performed by deleting predetermined information corresponding to outbound traffic included in a block list of the display device while the second information cannot be transmitted to the at least one other display device because outbound traffic of the display device is blocked.

In addition, the method may further include adding, when third information for blocking outbound traffic of the display device in the same manner as the at least one other display device is received, outbound traffic corresponding to the third information to a block list of the display device and controlling outbound traffic to be blocked based on the block list.

In addition, the method may further include controlling the third information to be transmitted to at least one other different display device.

Advantageous Effects of Disclosure

A method for controlling a display device and a display device according thereto, according to embodiments of the present disclosure, may control outbound traffic to be transmitted from at least one other display device in the same manner according to outbound traffic control of a predetermined display device.

In addition, the method for controlling a display device and the display device according thereto, according to embodiments of the present disclosure, may allow a user to select outbound traffic to be blocked among all outbound traffic, thereby increasing user convenience and efficiency in control of the display device.

MODE OF DISCLOSURE

Figure 1:
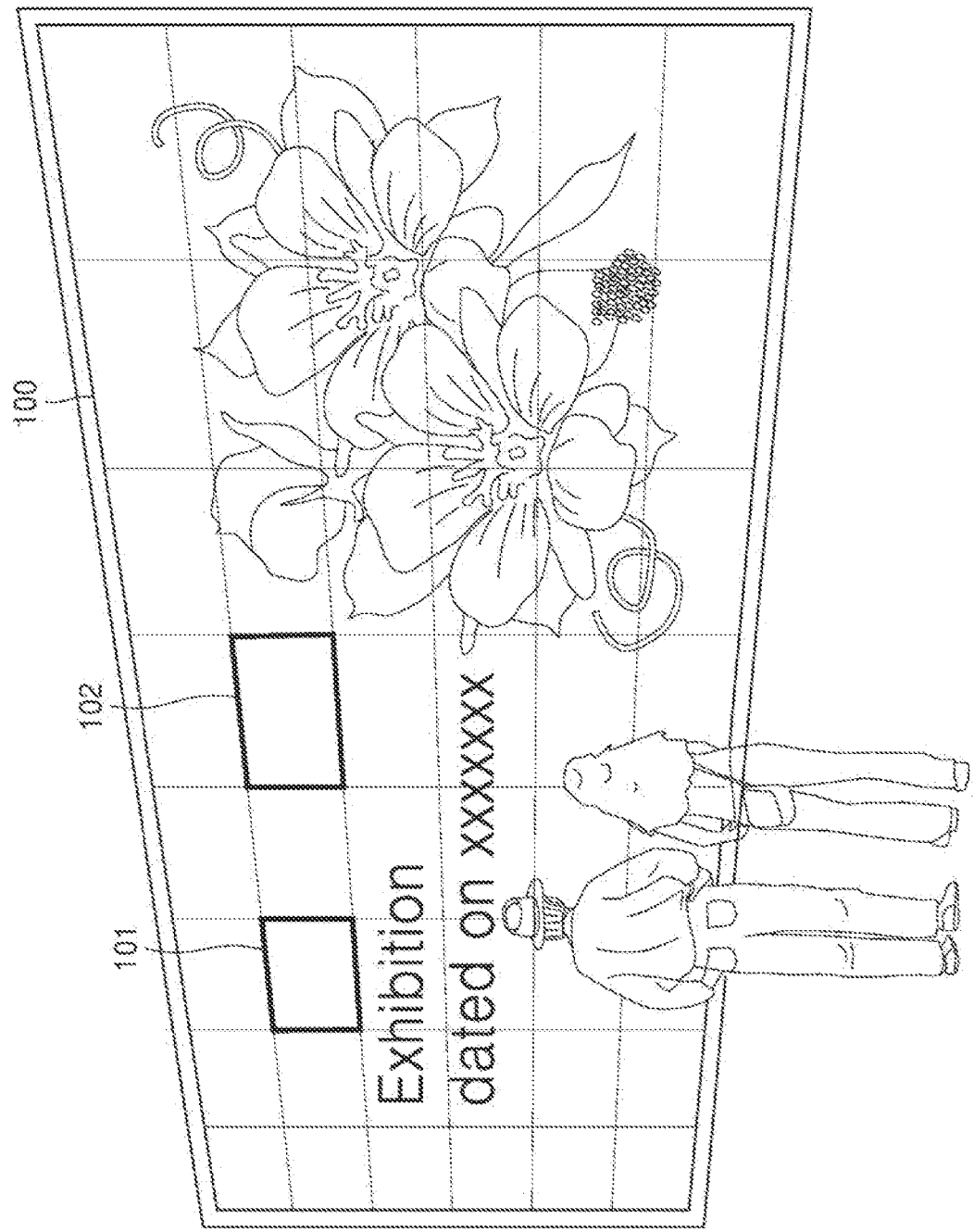
FIG. 1 illustrates a video wall using a large format display (LFD).

Hereinafter, embodiments of the present disclosure will be described in detail with reference to the accompanying drawings such that those of ordinary skill in the art to which the present disclosure belongs could easily carry out the embodiments. However, the present disclosure could be implemented in various different forms and is not limited to the embodiments described herein. In addition, in the drawings, parts irrelevant to the description are omitted to clearly describe the present disclosure, and like reference numerals denote like elements throughout the specification.

Throughout the specification, when it is described that a certain part is "connected" to another part, it should be understood that the certain part may be "directly connected" or "electrically connected" to another part via another element in the middle. In addition, when a certain part "includes" a certain component, this indicates that the part may further include another component instead of excluding another component unless there is different disclosure.

The wording such as "in some embodiments" or "in an embodiment" appearing at various places in the present specification does not necessarily indicate the same embodiment(s).

Some embodiments can be represented with functional blocks and various processing steps. Some or all of these functional blocks can be implemented by various numbers of hardware and/or software configurations for executing specific functions. For example, functional blocks in the present disclosure can be implemented by one or more processors or microprocessors or by circuit configurations for a predetermined function. In addition, for example, the functional blocks in the present disclosure can be implemented by various programming or scripting languages. The functional blocks can be implemented by an algorithm executed by one or more processors. In addition, the present disclosure can employ the related art for electronic environment setting, signal processing, data processing, and/or the like. The terms such as a module and a configuration may be widely used and are not limited to mechanical and physical configurations.

In addition, connection lines or connection members between components shown in the drawings only illustrate functional connections and/or physical or circuit connections. The connections between components can be represented by replaceable or additional various functional connections, physical connections, or circuit connections in an actual apparatus.

In addition, the wording 'at least one of A and B' indicates 'A or B' or 'A and B'.

Hereinafter, the present disclosure will be described in detail with reference to the accompanying drawings.

FIG. 1 illustrates a video wall using a large format display (LFD).

Display devices are used to transfer advertisements and guide information in police stations, fire stations, the meteorological administration, situation control rooms of military camps and the like, shopping mall lobbies, and the like. For example, LFD devices are larger than general display devices and may be commercially used to mainly play advertisement content. Particularly, a plurality of display devices such as LFD devices may be combined to form a video wall on which a single screen image is displayed, or used as a stand-alone type to independently display a single screen image through a single panel. In addition, the plurality of display devices used as a stand-alone type may also be used by being arranged in a predetermined space. In addition, display devices such as LFD devices may be provided to shopping malls, airports, and the like to display various kinds of information and used as a digital signage or a digital information display (DID) capable of displaying a guidance screen image.

Referring to FIG. 1, a plurality of display devices 101 and 102 are combined to form a single video wall 100. When forming the video wall 100, the plurality of display devices 101 and 102 are independent display devices and may be individually operated and individually transmit content to be displayed.

The video wall 100 including the plurality of display devices 101 and 102 may receive, through a network, content to be displayed.

Hereinafter, convenience of description, each of the plurality of display devices 101 and 102 is referred to as a 'single display device', and the video wall 100 is referred to as a 'display device'. Herein, the 'display device' may be not only the video wall 100 but also a stand-alone type for independently displaying a single screen image through a single panel.

Figure 2:
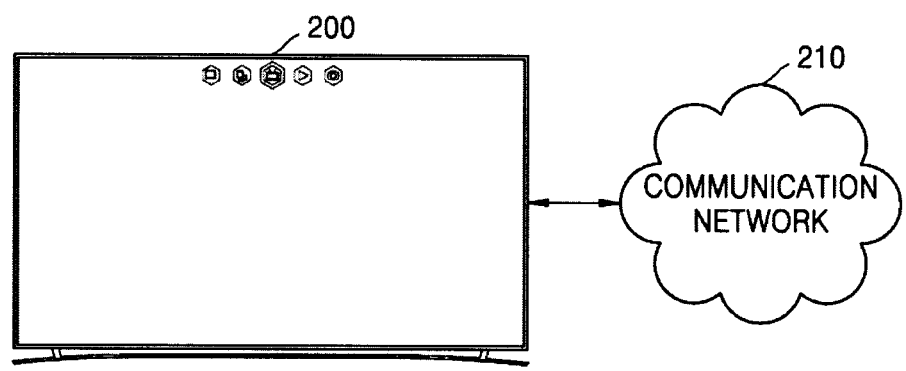
FIG. 2 illustrates a display device connected to a communication network, according to a disclosed embodiment.

FIG. 2 illustrates a display device connected to a communication network, according to a disclosed embodiment.

A display device 200 according to an embodiment of the present disclosure may correspond to the display device 100 described with reference to FIG. 1. Therefore, a description of the display device 200 duplicated with the description of the display device 100 of FIG. 1 is omitted.

Referring to FIG. 2, a communication network 210 may include a wired communication network and/or a wireless communication network, and various examples of the communication network 210 may be a local area network (LAN), a metropolitan area network (MAN), a wide area network (WAN), a world wide web (WWW), Wi-Fi, or the like.

In addition, through the communication network 210, the display device 200 may communicate with an external device such as a server (not shown), and request predetermined information from the server (not shown) or receive predetermined content from the server (not shown).

In addition, when the display device 200 requests, through the communication network 210, predetermined information or content from an external server connected to a network, outbound traffic may be transmitted. Meanwhile, when the display device 200 receives, through the communication network 210, predetermined content from the external server connected to the network, inbound traffic may be received. The display device 200 cannot control the inbound traffic received from the external server but may control the outbound traffic to be transmitted from the display device 200.

Herein, the outbound traffic indicates network traffic to be transmitted when the display device 200 requests predetermined information from at least one external server connected to the network. For example, the transmission of the outbound traffic may include transmission of data corresponding to a request for synchronizing a time of the display device 200 with that of an external server, transmission of status information of the display device 200 related to whether to be receivable content, or transmission of data for checking a status about whether to be connectable to an external network but is not limited thereto, and the outbound traffic may include predetermined network traffic generated when the display device 200 transmits predetermined information to at least one external server connected to the network.

Along with the recent development of communication technology, types of outbound traffic to be transmitted from a display device have been various, and outbound traffic, which is not intended by a user, may be automatically generated. Accordingly, when outbound traffic, which is not intended by the user, is transmitted through the network, information, which is not intended by the user, may be transmitted, and thus, a security problem may occur. Furthermore, when a display device is connected to a pay network, transmission of outbound traffic may cause an expense for the use of the pay network.

Therefore, to overcome the problems described above, the embodiments of the present disclosure provide a method for controlling a display device and a display device according thereto, by which outbound traffic generated by a display device can be controlled according to an intention of a user.

Particularly, according to the embodiments of the present disclosure, when a user uses a plurality of display devices, the user can select and block outbound traffic to be controlled in a display device and apply the blocking to at least one other display device in the same manner.

Hereinafter, a method for controlling a display device and a method, performed by a display device according thereto, for controlling outbound traffic of a plurality of display devices, according to embodiments of the present disclosure, will be described.

Figure 3:
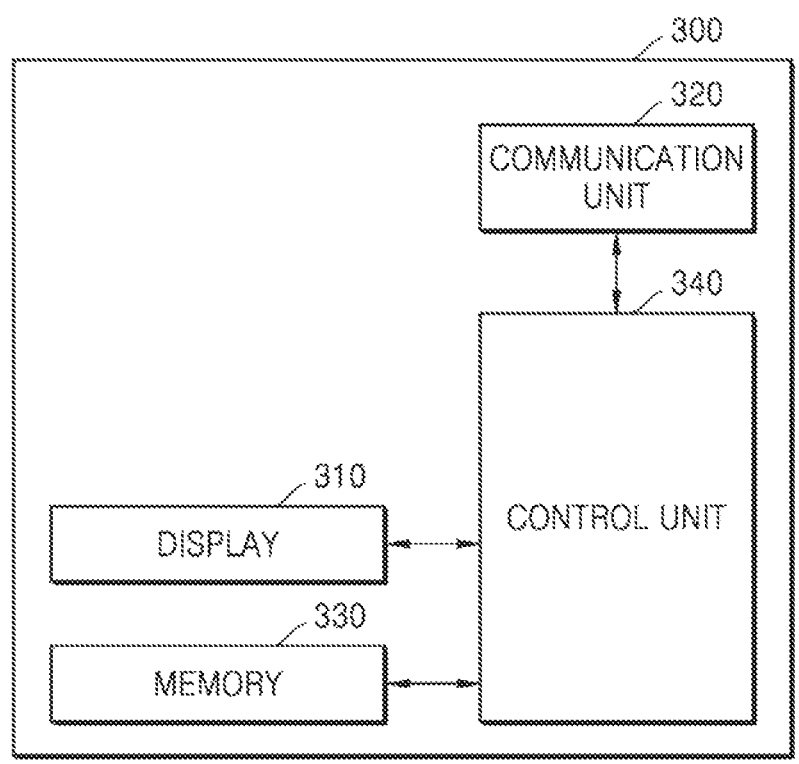
FIG. 3 is a block diagram of a display device according to a disclosed embodiment.

FIG. 3 is a block diagram of a display device according to a disclosed embodiment. A display device 300 according to an embodiment of the present disclosure may correspond to the display devices 100 and 200 described with reference to FIGS. 1 and 2. Therefore, a description of the display device 300 duplicated with the description of the display devices 100 and 200 made with reference to FIGS. 1 and 2 is omitted.

Referring to FIG. 3, the display device 300 according to an embodiment of the present disclosure includes a display 310, a communication unit 320 configured to communicate with an external server (not shown), a memory 330, and a control unit 340 including at least one processor (not shown) configured to execute one or more instructions.

In an embodiment of the present disclosure, the display device 300 includes the display 310, the communication unit 320 configured to communicate with at least one other display device, the memory 330 storing the one or more instructions, and the control unit 340 including the at least one processor (not shown) configured to execute at least one of the one or more instructions stored in the memory 330.

Herein, the processor (not shown) may acquire first information corresponding to outbound traffic to be transmitted from the communication unit 320, block outbound traffic corresponding to second information including at least a portion of the first information, and control a first user interface (UI) (not shown) to be displayed to select whether to block outbound traffic of at least one other display device (not shown) in the same manner as the display device 300 by transmitting the second information to the at least one other display device through the communication unit 320.

The display device 300 according to the disclosed embodiment may communicate with at least one other display device connected to a network.

Particularly, the display 310 displays a screen image. The display 310 may be a screen image output device including a display panel (not shown) outputting a screen image so that a user can visually recognize an image. For example, the display 310 may include an LFD, which can output a large-size screen image. In addition, the display 310 may include a cathode ray tube (CRT) display, a liquid crystal display (LCD), a plasma display panel (PDP) display, an organic light-emitting diode (OLED) display, a field emission display (FED), a light-emitting diode (LED) display, a vacuum fluorescent display (VFD), a digital light processing (DLP) display, a flat panel display (PFD), a three-dimensional (3D) display, a transparent display, or the like.

The communication unit 320 may transmit and receive data to and from an external device, e.g., at least one other display device (not shown) or an external server (not shown), through the network.

Particularly, the communication unit 320 may transmit predetermined information to at least one other display device connected to the network. That is, the control unit 340 may control the communication unit 320 to transmit predetermined information corresponding to outbound traffic to at least one other display device.

To transmit predetermined information to at least one other display device connected to the network, the control unit 340 may include at least one of a short-range communication module (not shown) conforming to short-range communication technology, a wired communication module (not shown), and a mobile communication module (not shown).

The short-range communication module (not shown) indicates a module for short-range communication within a predetermined distance. The short-range communication technology according to an embodiment of the present disclosure may include wireless LAN, Wi-Fi, Bluetooth, Zigbee, Wi-Fi Direct (WFD), ultra wideband (UWB), infrared data association (IrDA), Bluetooth low energy (BLE), near-field communication (NFC), or the like but is not limited thereto.

The wired communication module (not shown) indicates a module for communication using an electrical signal or an optical signal, and wired communication technology according to an embodiment may include pair cable, coaxial cable, Ethernet cable, or the like.

The mobile communication module (not shown) transmits and receives a wireless signal to and from at least one of a base station, an external terminal, and a server in a mobile communication network. Herein, the wireless signal may include various types of data according to transmission and reception of a voice call signal, a video call signal, or a text/multimedia message.

The memory 330 stores one or more instructions. In addition, the memory 330 may store a predetermined program and/or data or information.

In an embodiment of the present disclosure, the memory 330 may store at least one of pieces of information for controlling outbound traffic, which are received from at least one other display device through the communication unit 320.

The memory 330 may include various types of storage media. For example, the memory 330 may include at least one type of storage medium among a flash memory type memory, a hard disk type memory, a multimedia card micro type memory, a card type memory (a secure digital (SD) memory, an extreme digital (XD) memory, or the like), random access memory (RAM) static random access memory (SRAM), read-only memory (ROM), electrically erasable programmable read-only memory (EEPROM), programmable read-only memory (PROM), a magnetic memory, a magnetic disc, and an optical disc.

Particularly, the memory 330 may store information, e.g., a source Internet protocol (IP) address, a destination IP address, a traffic volume, a traffic transmission time, and the like, corresponding to outbound traffic of the display device 300. Furthermore, the memory 330 may update and store information corresponding to outbound traffic, which is acquired by the control unit 340.

The control unit 340 may generally control an operation of the display device 300.

Particularly, the control unit 340 may perform a control to acquire first information corresponding to outbound traffic to be transmitted from the display device 300 and block outbound traffic corresponding to second information including at least a portion of the first information.

Herein, the first information may be acquired when outbound traffic is transmitted from the display device 300, under control of the control unit 340. That is, the first information may include information related to outbound traffic to be transmitted when the control unit 340 requests predetermined information from at least one external server connected to the network. For example, the control unit 340 may transmit a request for synchronizing a time of the display device 300 with that of at least one external server connected to the network. In this case, the information related to the outbound traffic to be transmitted may include a source IP address, a destination IP address, a traffic volume, a transmission time, and the like.

The control unit 340 according to an embodiment of the present disclosure may first determine whether traffic to be transmitted from the communication unit 320 is transmitted from the display device 300, to acquire the first information corresponding to the outbound traffic to be transmitted from the display device 300. For example, a processor (not shown) may operate a predetermined module (e.g., a tcp-dump module) to filter network traffic having a source IP address as an IP address of the display device 300. If a source IP address of predetermined network traffic corresponds to the IP address of the display device 300 as the network filtering result, the control unit 340 may determine this network traffic as outbound traffic. In the present embodiment, although only a method, performed by the control unit 340, for determining based on a source IP address whether network traffic to be transmitted from the display device 300 is outbound traffic is illustrated, the present embodiment is not limited thereto, and any other method capable of determining outbound traffic may be used.

In addition, the first information may include a list including at least one of an IP address, a uniform resource locator (URL), or a media access control (MAC) address related to outbound traffic to be transmitted when the control unit 340 requests predetermined information from at least one external server connected to the network.

As described above, the control unit 340 may generate an outbound traffic list by determining, as outbound traffic, network traffic of which a source IP address is the IP address of the display device 300. Accordingly, the control unit 340 may acquire a destination IP address of the outbound traffic included in the outbound traffic list.

In addition, the control unit 340 may acquire a URL corresponding to the outbound traffic. The URL may provide a server address by which it may be identified in which server corresponding information is located. Particularly, the control unit 340 may acquire, as URLs, server addresses for which outbound traffic is generated by the display device 300, and provide a URL corresponding to outbound traffic to be blocked to at least one other display device.

In addition, the control unit 340 may acquire a MAC address of the at least one other display device. A MAC address may be unique information of a display device. Particularly, because each display device has a unique MAC address, if a MAC address is obtained, each display device may be identified. Therefore, the control unit 340 may acquire a MAC address of at least one other display device of which outbound traffic is to be blocked in the same manner as the display device 300.

According to an embodiment of the present disclosure, when a block request for all outbound traffic to be transmitted from the display device 300 is received, the control unit 340 may add, to a block list, information corresponding to all the outbound traffic to be transmitted from the display device 300 and perform a control so that all the outbound traffic to be transmitted from the display device 300 is blocked.

According to an embodiment of the present disclosure, when a block request for predetermined outbound traffic that is at least one of all the outbound traffic to be transmitted from the display device 300 is received, the control unit 340 may perform a control so that a UI screen image on which a list of all the outbound traffic is displayed is output based on the first information. Particularly, the control unit 340 may display a list including at least one of an IP address, a URL, or a MAC address related to outbound traffic to be transmitted when requesting predetermined information from at least one external server connected to the network, and perform a control so that a second UI for selecting an item to be blocked from the list and generating second information is displayed.

The list included in the first information may include not only the IP address, the URL, or the MAC address described above but also a type, a volume, a generation time, and the like of the outbound traffic.

Accordingly, when a user input for selecting at least one of all the outbound traffic is received through the UI screen image, the control unit 340 may generate second information including information about the at least one outbound traffic selected by the user input. Accordingly, the control unit 340 may control blocking of the outbound traffic corresponding to the second information.

In addition, the control unit 340 may transmit the second information to display a UI for selecting whether to block outbound traffic of at least one other display device in the same manner as the display device 300. For example, the control unit 340 may select a MAC address of at least one other display device to be blocked, through the UI based on the list including the first information, and transmit the second information to the selected display device.

In the related art, when outbound traffic is transmitted from a plurality of display devices, all the outbound traffic is individually blocked for each display device. However, according to an embodiment of the present disclosure, when outbound traffic is transmitted from each of a plurality of display devices, predetermined outbound traffic including at last a portion of all the outbound traffic may be selectively blocked, and this blocking may be applied to at least one other display device in the same manner, and thus, user convenience may be improved.

According to an embodiment of the present disclosure, the control unit 340 may add the outbound traffic corresponding to the second information to a block list and block at least a portion of outbound traffic to be transmitted from the display device 300. Herein, the block list may include at least one of a destination IP address, a URL, or a MAC address related to the outbound traffic corresponding to the second information.

For example, the control unit 340 may add a destination IP address to the block list to block outbound traffic corresponding to the destination IP address. The control unit 340 may add an IP table to the block list for blocking outbound traffic. That is, a destination IP address may be included in the IP table to block corresponding outbound traffic. As a method for blocking outbound traffic corresponding to a destination IP address, only the IP table is illustrated, but the method is not limited thereto, and a general network traffic blocking method or a corresponding open source may be used.

The control unit 340 may transmit second information for controlling outbound traffic to at least one other display device through the communication unit 320. Accordingly, upon receiving the second information, the at least one other display device may generate a block list based on the second information and block outbound traffic corresponding to the second information based on the generated block list.

A method, performed by the control unit 340, for transmitting second information may include at least one of a broadcast scheme, a multicast scheme, or a scheme of communicating with at least one other display device connected to an AP in the network, and the control unit 340 may control transmission of the second information to the at least one other display device by using at least one of these schemes.

In addition, the control unit 340 may periodically update the second information and control transmission of the updated second information to the at least one other display device. Accordingly, outbound traffic of the at least one other display device may be blocked in the same manner as the display device 300. In addition, the control unit 340 may transmit the second information in a period of a predetermined time interval as a preparation for a case where the second information cannot be transmitted to the at least one other display device.

In addition, the control unit 340 may perform a control so that deblocking is performed by deleting predetermined information corresponding to outbound traffic included in the block list while the second information cannot be transmitted to the at least one other display device because predetermined outbound traffic of the display device 300 is blocked.

In addition, upon receiving third information for blocking outbound traffic from at least one other display device, the control unit 340 may block corresponding outbound traffic by adding outbound traffic corresponding to the third information to the block list of the display device 300 based on the third information. That is, the display device 300 may control outbound traffic of at least one other display device, and outbound traffic of the display device 300 may also be controlled by the at least one other display device. An operation, performed by the control unit 340, of adding outbound traffic corresponding to the third information to the block list is the same as the aforementioned operation of adding outbound traffic corresponding to the second information to the block list, and thus, a description thereof is omitted herein.

It is assumed that following outbound traffic is transmitted from the display device 300. For example, outbound traffic to be transmitted may include outbound traffic (first outbound traffic) for transmitting a request for synchronizing a time of the display device 300 with that od an external server, outbound traffic (second outbound traffic) for transmitting status information of the display device 300 related to whether to be receivable content, and outbound traffic (third outbound traffic) for transmitting a status of the display device 300 about whether to be connectable to an external network. In this case, a method for controlling a plurality of display devices by control of individual display devices will now be described. For convenience of description, the display device 300 is referred to as a first display device, and the at least one other display device is referred to as a second display device.

The control unit 340 may control the display 310 to display the UI screen image for controlling outbound traffic. If the user wants to block all outbound traffic, the control unit 340 may receive a user input for selecting 'block all outbound traffic' without displaying the first outbound traffic to the third outbound traffic on the UI screen image, and block the first outbound traffic to the third outbound traffic (all the outbound traffic) to be transmitted from the display device 300. In addition, the control unit 340 may block all outbound traffic even for the second display device. The control unit 340 may block all outbound traffic of the second display device by transmitting at least one of a message or a command for blocking all the outbound traffic to be transmitted from the second display device. The second information may be transmitted by using an 'Apply to other device menu key' provided to the UI screen image.

In addition, as a transmission scheme of the second information, a broadcast scheme, a multicast scheme, or a scheme of searching for a display device connected to a network AP and communicating with the found display device may be used.

Otherwise, if the user wants to block only outbound traffic (the first outbound traffic) for transmitting a request for synchronizing a time with that of an external server among all the outbound traffic, the control unit 340 may generate an outbound traffic list. In addition, the control unit 340 may control the generated outbound traffic list to be displayed on the UI screen image, and receive a user input for the first outbound traffic, which the user wants to block, among the first outbound traffic to the third outbound traffic.

In this case, the control unit 340 may scan outbound traffic to be transmitted from the first display device and output the UI screen image including the scanned outbound traffic. For example, when the first outbound traffic targeted by the user is scanned, the user may select a stop button after the first outbound traffic is displayed on the UI screen image so that the control unit 340 does not have to scan outbound traffic any more. In addition, the control unit 340 may receive outbound traffic, which the user wants to be block, from the outbound traffic list including the scanned outbound traffic. Accordingly, the control unit 340 may control blocking of the first outbound traffic selected from the first display device. In addition, if the user also wants to apply blocking of the first outbound traffic to the second display device in the same manner as the first display device, at least one of information, a message, or a command needed to block predetermined outbound traffic may be transmitted to block the first outbound traffic of the second display device. Likewise, a scheme of transmitting the second information may be the same as a scheme of transmitting the second information for blocking all outbound traffic.

Meanwhile, the first display device may receive, from the second display device, the third information for blocking the second outbound traffic. The second display device may periodically transmit the third information as a preparation for a case where the third information cannot be received. Herein, the transmitted third information may be periodically updated by the second display device, and accordingly, an outbound traffic status of the first display device may be controlled to be the same as that of the second display device.

The control unit 340 may block the second outbound traffic by adding the second outbound traffic corresponding to the third information to the block list.

In this case, when all outbound traffic of the first display device is already blocked, the control unit 340 may perform unblocking to transmit the third information to a different display device, and block all the outbound traffic again after transmitting the third information.

Therefore, the display device 300 may select outbound traffic to be blocked and apply same to at least one other display device in the same manner, thereby increasing user convenience and efficiency.

An operation of the control unit 340 to control outbound traffic of a plurality of display devices will be described below in detail with reference to FIGS. 5 to 11.

Figure 4:
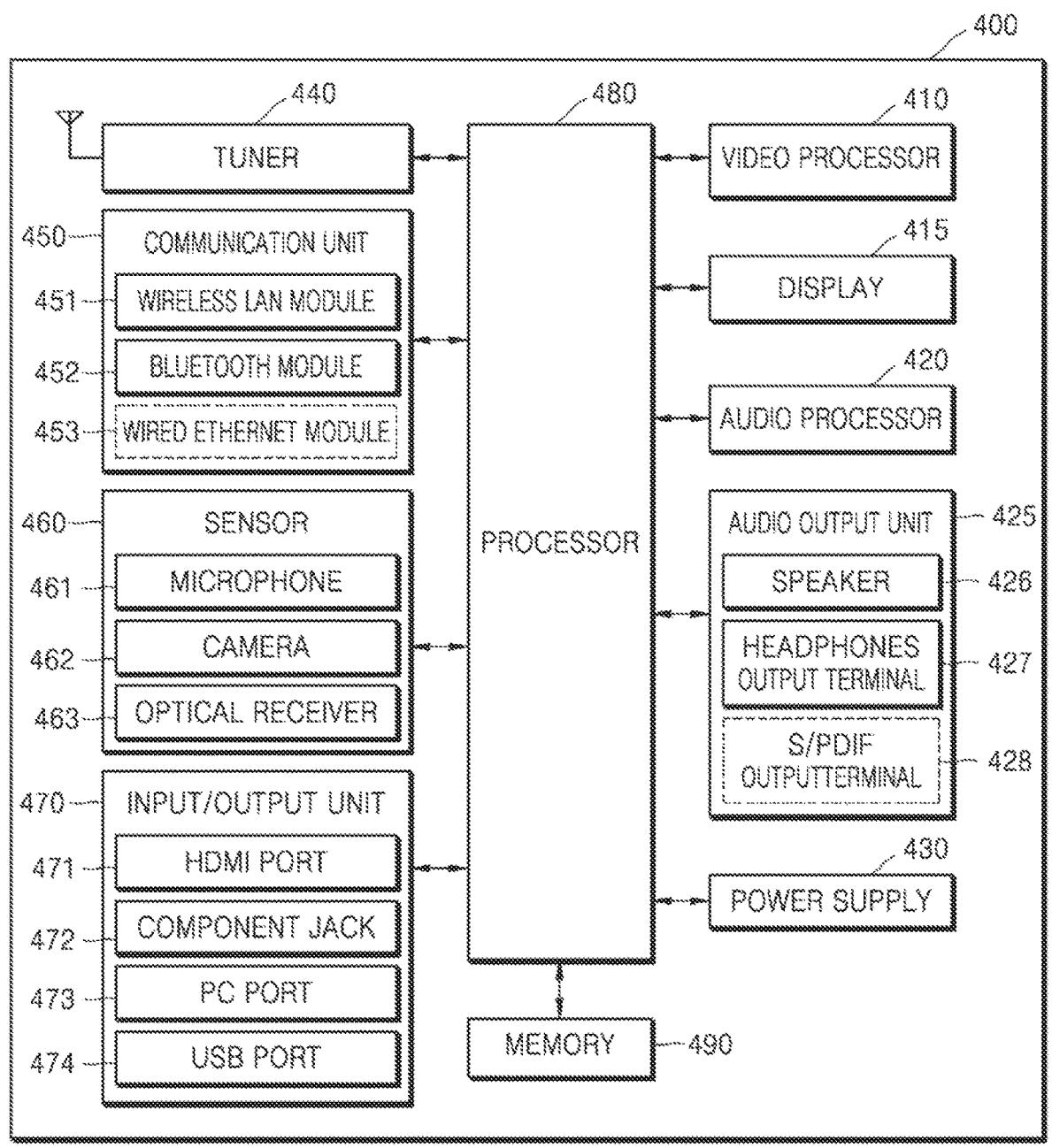
FIG. 4 is a detailed block diagram of a display device according to a disclosed embodiment.

FIG. 4 is a detailed block diagram of a display device according to a disclosed embodiment. A display device 400 according to an embodiment of the present disclosure, may correspond to the display devices 100 to 300 described with reference to FIGS. 1 to 3. Particularly, a communication unit 450 and a tuner 440, a control unit 480, a display 415, and a memory 490 of the display device 400 may correspond to the communication unit 320, the control unit 340, the display 310, and the memory 330 shown in FIG. 3, respectively. In addition, the display device 400 may further include a component corresponding to a UI (not shown) in addition to the components shown in FIG. 4.

In a description of the display device 400, a duplicated description of FIGS. 1 to 3 is omitted.

Referring to FIG. 4, the display device 400 includes a video processor 410, the display 415, an audio processor 420, an audio output unit 425, a power supply 430, the tuner 440, the communication unit 450, a sensor 460, an input/output unit 470, the control unit 480, and the memory 490.

The video processor 410 processes video data received by the display device 400. The video processor 410 may perform various kinds of image processing, such as decoding, scaling, noise filtering, frame rate conversion, and resolution conversion, on video data.

The control unit 480 may receive a write request for the video data processed by the video processor 410 and perform a control so that the video data is encrypted and recorded on a memory device (not shown), e.g., RAM (not shown), included in the control unit 480 or the memory 490.

The display 415 displays, on a screen, a video included in a broadcast signal received through the tuner 440, under control of the control unit 480. In addition, the display 415 may display content (e.g., a moving picture) input through the communication unit 450 or the input/output unit 470.

In addition, the display 415 may output an image stored in the memory 490, under control of the control unit 480. In addition, the display 415 may display a voice UI (e.g., including a voice instruction guide) for performing a voice recognition task corresponding to voice recognition or a motion UI (e.g., including a user motion guide for motion recognition) for performing a motion recognition task corresponding to motion recognition.

The audio processor 420 processes audio data. The audio processor 420 may perform various kinds of processing, such as decoding, amplification, and noise filtering, on audio data. The audio processor 420 may include a plurality of audio processing modules to process audio corresponding to a plurality of pieces of content.

The audio output unit 425 outputs audio included in a broadcast signal received through the tuner 440, under control of the control unit 480. The audio output unit 425 may output audio (e.g., a voice or a sound) input through the communication unit 450 or the input/output unit 470. In addition, the audio output unit 425 may output audio stored in the memory 490, under control of the control unit 480. The audio output unit 425 may include at least one of a speaker 426, a headphones output terminal 427, or a Sony/Philips digital interface (S/PDIF) output terminal 428. The audio output unit 425 may include a combination of the speaker 426, the headphones output terminal 427, and the S/PDIF output terminal 428.

The power supply 430 supplies power input from an external power source to the components 410 to 490 in the display device 400, under control of the control unit 480. In addition, the power supply 430 may supply power output from one or more batteries (not shown) located in the display device 400 to the components 410 to 490, under control of the control unit 480.

The tuner 440 may tune and select only a frequency of a channel which the display device 400 desires to receive from among a number of frequency components through amplification, mixing, resonance, and the like of a broadcast signal received in a wired or wireless manner. The broadcast signal includes audio, video, and additional information (e.g., electronic program guide (EPG)).

The tuner 440 may receive a broadcast signal in a predetermined frequency band according to an external input (e.g., a received control signal, examples of the control signal are external inputs such as a high definition multimedia interface (HDMI) signal, a digital visual interface (DVI) signal, or a DisplayPort (DP) signal). Herein, the external inputs may be control signals, e.g., a channel number input, a channel up-down input, and a channel input on an EPG screen image, received from an external control device (not shown), a remote controller (not shown), or the like.

The tuner 440 may receive broadcast signals from various sources such as terrestrial broadcasting stations, cable broadcasting stations, satellite broadcasting stations, and Internet broadcasting stations. The tuner 440 may receive broadcast signals from sources such as analog broadcasting stations or digital broadcasting stations. The broadcast signal received through the tuner 440 is decoded (e.g., audio-decoded, video-decoded, or additional information-decoded) and divided into audio, video, and/or additional information. The divided audio, video, and/or additional information may be stored in the memory 490 under control of the control unit 480.

The tuner 440 of the display device 400 may be one or plural in number. According to an embodiment, when a plurality of tuners 440 are included, a plurality of broadcast signals may be output to a plurality of windows constituting a multi-window screen provided to the display 415.

The tuner 440 may be implemented as an all-in-one type with the display device 400 or implemented by a separate device (e.g., a set-top box (not shown), or a tuner (not shown) connected to the input/output unit 470) having a tuner electrically connected to the display device 400.

The communication unit 450 may connect the display device 400 to an external device (e.g., an audio device) under control of the control unit 480. The control unit 480 may transmit/receive predetermined information or predetermined content to/from an external device connected through the communication unit 450, download an application from the external device, or perform web browsing. Particularly, the control unit 480 may access a network through the communication unit 450 to transmit outbound traffic for receiving content from an external device (not shown).

As described above, the communication unit 450 may include at least one of a short-range communication module (not shown), a wired communication module (not shown), and a mobile communication module (not shown).

FIG. 4 shows an example in which the communication unit 450 includes one of a wireless LAN module 451, a Bluetooth module 452, and a wired Ethernet module 453.

Alternatively, the communication unit 450 may include a combination of the wireless LAN module 451, the Bluetooth module 452, and the wired Ethernet module 453. In addition, the communication unit 450 may receive a control signal of a control device (not shown) under control of the control unit 480. The control signal may be implemented as a Bluetooth type, a radio frequency (RF) signal type, or a Wi-Fi type.

The communication unit 450 may further include another short-range communication module (e.g., an NFC module (not shown) or a separate BLE module (not shown)) in addition to the Bluetooth module 452.

In addition, in FIG. 4, the tuner 440 and the communication unit 450 correspond to the communication unit 320 of FIG. 3 and may be implemented in a form in which the communication unit 450 further includes the tuner 440.

In the disclosed embodiment, the communication unit 450 may transmit or receive information corresponding to outbound traffic to or from at least one other display device connected to a network.

The sensor 460 may detect a voice of a user, an image of the user, or an interaction of the user.

A microphone 461 receives an uttered voice of the user. The microphone 461 may convert the received voice into an electrical signal and output the electrical signal to the control unit 480. The user's voice may include, for example, a voice corresponding to a menu or a function of the display device 400. For example, a recognition range of the microphone 461 is recommended to be within 4 m from the microphone 461 to the user's location, and the recognition range of the microphone 461 may vary in response to a volume of the user's voice and a surrounding environment (e.g., a speaker volume and ambient noise).

The microphone 461 may be implemented as an all-in-one type or a separated type with or from the display device 400. The separated microphone 461 may be electrically connected to the display device 400 through the communication unit 450 or the input/output unit 470.

It will be easily understood by those of ordinary skill in the art that the microphone 461 may be omitted according to performance and a structure of the display device 400.

A camera 462 receives an image (e.g., continuous frames) corresponding to the user's motion including a gesture within a camera recognition range. For example, the recognition range of the camera 462 may be a distance of 0.1 m to 5 m from the camera 462 to the user. The user's motion may include a motion of a portion of the user's body or a portion of the user, e.g., a face, an expression, a hand, a fist, or a finger of the user. The camera 462 may convert the received image into an electrical signal under control of the control unit 480 and output the electrical signal to the control unit 480. The camera 462 may be included in a sensor 460 shown in FIG. 4.

The control unit 480 may select a menu displayed on the display device 400 or perform a control corresponding to a motion recognition result, by using the received motion recognition result. For example, channel adjustment, volume adjustment, and indicator movement may be included.

The camera 462 may include a lens (not shown) and an image sensor (not shown). The camera 462 may support optical zoom or digital zoom by using a plurality of lenses and image processing. The recognition range of the camera 462 may be variously set according to camera angles and surrounding environment conditions. When the camera 462 includes a plurality of cameras, a 3D still image or a 3D motion may be received by using the plurality of cameras.

The camera 462 may be implemented as an all-in-one type or a separated type with or from the display device 400. A separate device (not shown) including the separated camera 462 may be electrically connected to the display device 400 through the communication unit 450 or the input/output unit 470.

It will be easily understood by those of ordinary skill in the art that the camera 462 may be omitted according to performance and a structure of the display device 400.

An optical receiver 463 receives an optical signal (including a control signal) received from an external control device (not shown), through an optical window (not shown) or the like of a bezel of the display 415. The optical receiver 463 may receive an optical signal corresponding to a user input (e.g., a touch, a push, a touch gesture, a voice, or a motion) from the control device (not shown). The control signal may be extracted from the received optical signal under control of the control unit 480.

For example, the optical receiver 463 may receive a signal corresponding to a pointing location of the control device (not shown) and transmit the signal to the control unit 480. For example, when a UI screen image for receiving data or a command from the user is output through the display 415, and when the user desires to input data or a command to the display device 400 through the control device (not shown), the optical receiver 463 may receive a signal corresponding to a motion of the control device (not shown) in a contact state of a finger of the user on a touch pad (not shown) provided to the control device (not shown) and transmit the signal to the control unit 480. In addition, the optical receiver 463 may receive a signal indicating that a specific button provided to the control device (not shown) is pushed, and transmit the signal to the control unit 480. For example, when the user pushes, with a finger of the user, the touch pad (not shown) provided as a button type to the control device (not shown), the optical receiver 463 may receive a signal indicating that the button-type touch pad (not shown) is pushed, and transmit the signal to the control unit 480. For example, the signal indicating that the button-type touch pad (not shown) is pushed may be used as a signal for selecting one of items.

The input/output unit 470 receives a video (e.g., a moving picture or the like), audio (e.g., a voice, music, or the like), and additional information (e.g., EPG or the like) from the outside of the display device 400 under control of the control unit 480. The input/output unit 470 may include one of an HDMI port 471, a component hack 472, a personal computer (PC) port 473, and a universal serial bus (USB) port 474. The input/output unit 470 may include a combination of the HDMI port 471, the component hack 472, the PC port 473, and the USB port 474.

It will be easily understood by those of ordinary skill in the art that a configuration and an operation of the input/output unit 470 may be variously implemented according to embodiments of the present disclosure.

The control unit 480 controls a general operation of the display device 400 and signal flows among internal components (not shown) of the display device 400 and performs a function of processing data. When there is a user input, or when a preset and stored condition is satisfied, the control unit 480 may execute an operating system (OS) and various applications stored in the memory 490.

The control unit 480 may include RAM (not shown) used to store a signal or data input from the outside of the display device 400 or used as a storage region corresponding to various works performed by the display device 400, ROM (not shown) in which a control program for control of the display device 400 is stored, and a processor (not shown).

The processor (not shown) may include a graphic processing unit (GPU) (not shown) configured to perform graphic processing corresponding to a video. The processor (not shown) may be implemented by a system on chip (SoC) in which a core (not shown) is integrated with the GPU. The processor (not shown) may include a single core, dual cores, triple cores, quadruple cores, or a multiple number of cores thereof.

In addition, the processor (not shown) may include a plurality of processors. For example, the processor (not shown) may be implemented by a main processor (not shown) and a sub-processor (not shown) operating in a sleep mode.

The GPU (not shown) generates a screen image including various objects such as an icon, an image, and a text by using a calculator (not shown) and a renderer (not shown). The calculator calculates a coordinate value at which each object is to be displayed and attribute values of a shape, a size, a color, and the like of each object according to a layout of a screen image by using a user interaction detected through the sensor 460. The renderer generates screen images of various layouts including an object based on the attribute values calculated by the calculator. A screen image generated by the renderer is displayed on a display area of the display 415.

Figure 5:
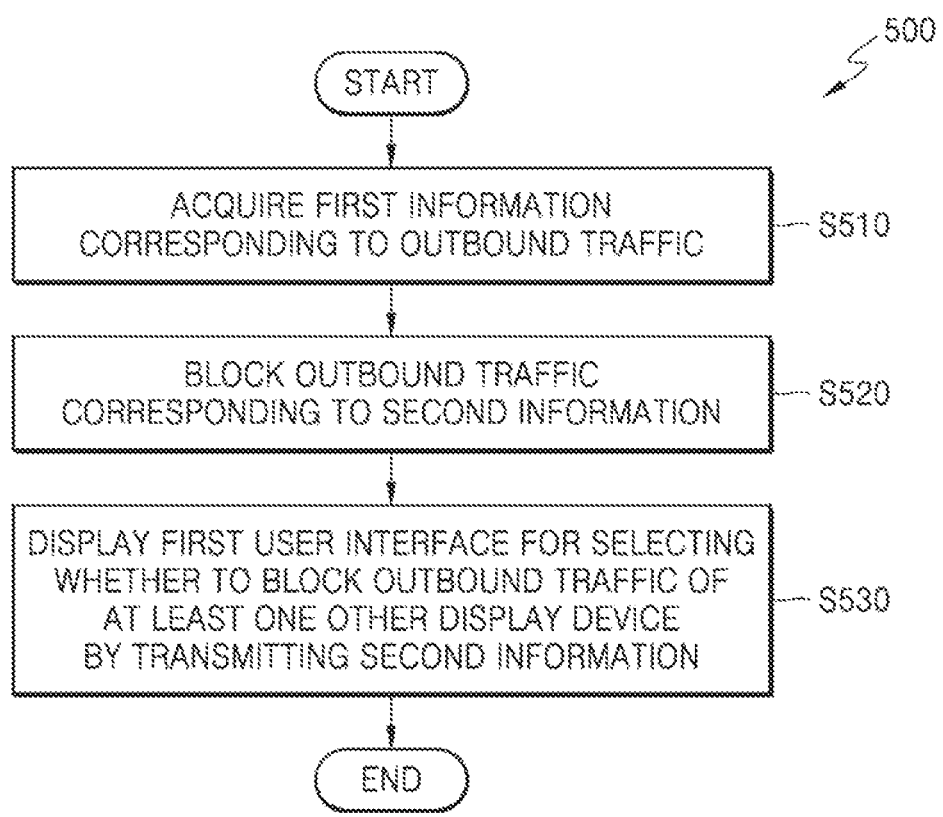
FIG. 5 is a flowchart of an operation of a display device, according to a disclosed embodiment.

FIG. 5 is a flowchart of a method for controlling a display device, according to a disclosed embodiment. A method 500 for controlling a display device, according to an embodiment of the present disclosure, may be performed by the display device 200 or 300 according to an embodiment of the present disclosure, which has been described with reference to FIGS. 1 to 4, and the operations performed by the display device 200 or 300 may correspond to operations included in the method 500 for controlling a display device. Therefore, in a description of the method 500 for controlling a display device, a duplicated description of FIGS. 1 to 4 is omitted.

Referring to FIG. 5, the method 500 for controlling a display device, according to an embodiment of the present disclosure, may include operation S510 of acquiring first information corresponding to outbound traffic. Operation S510 may be performed by acquiring first information corresponding to outbound traffic to be transmitted from the communication unit 320, under control of the control unit 340. As described above, the first information may be acquired by determining, by the control unit 340, whether a source IP address is an IP address of the display device 300. The acquired first information may be stored in the memory 330 under control of the control unit 340.

In addition, the method 500 for controlling a display device, according to an embodiment of the present disclosure, may include operation S520 of blocking, by the control unit 340, outbound traffic corresponding to second information including at least a portion of the first information. That is, the control unit 340 may block the outbound traffic corresponding to the second information including selected information upon receiving a user input for selecting at least a portion of the first information.

In addition, the method 500 for controlling a display device, according to an embodiment of the present disclosure, may include operation S530 of displaying a first user interface for selecting whether to block outbound traffic of at least one other display device by transmitting the second information. Therefore, the at least one other display device having received the second information may block outbound traffic based on the second information. A method, performed by the control unit 340, for transmitting the second information will be described in detail with reference to FIG. 9.

Figure 6:
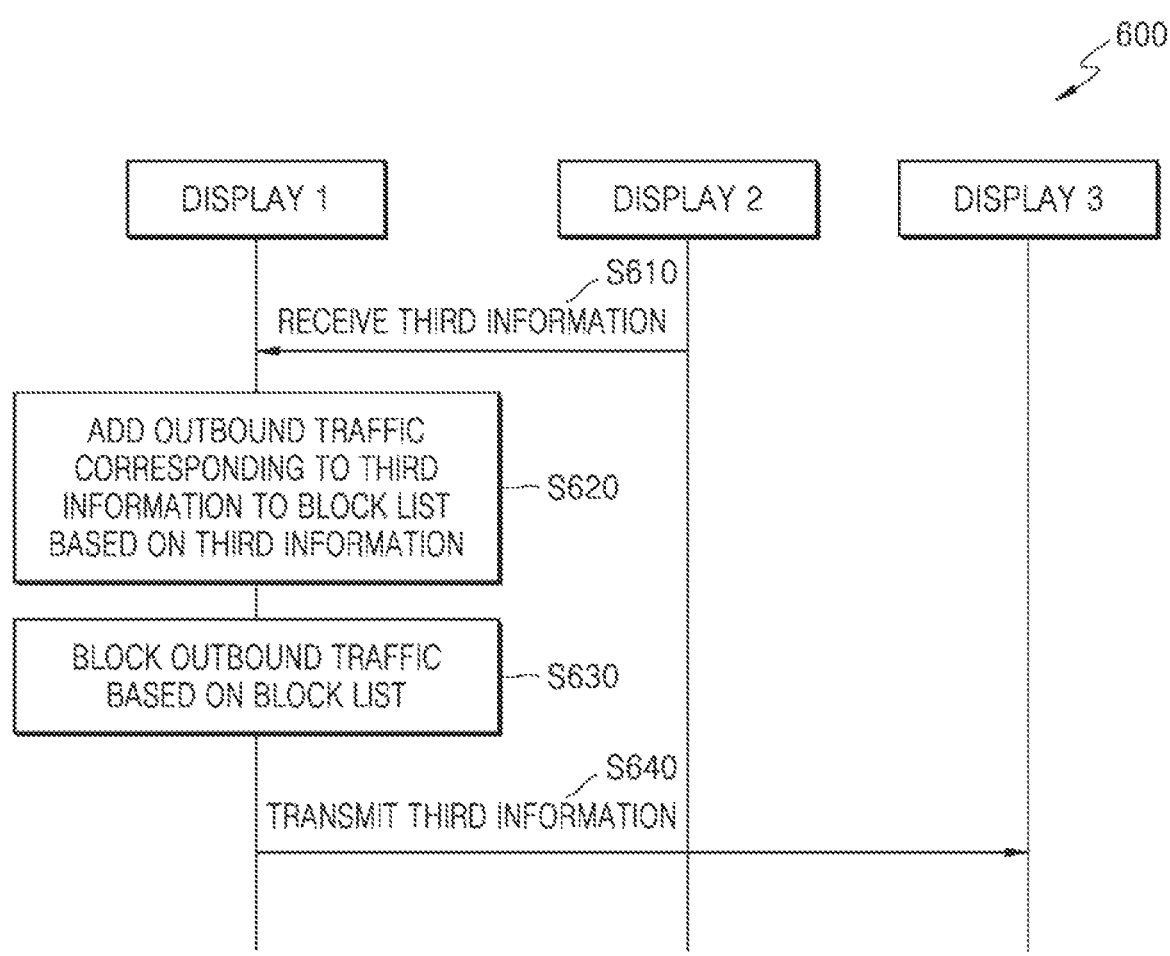
FIG. 6 is a signaling diagram of an operation of the disclosed display device.

FIG. 6 is a signaling diagram of an operation of the disclosed display device, according to a disclosed embodiment. A method 600 for controlling a display device, according to an embodiment of the present disclosure, may be performed by the display device 200 or 300 according to an embodiment of the present disclosure, which has been described with reference to FIGS. 1 to 5, and the operations performed by the display device 200 or 300 may correspond to operations included in the method 600 for controlling a display device.

In addition, in FIG. 6, the display device 300 corresponds to a first display DISPLAY 1, at least one other display device corresponds to a second display DISPLAY 2, a different display device corresponds to a third display DISPLAY 3, and for convenience of description, the display device 300, the at least one other display device, and the different display device are referred to as a first display device, a second display device, and a third display device, respectively.

Referring to FIG. 6, the method 600 for controlling a display device may include operation S610 in which the first display device receives third information from the second display device. In operation S610, the third information may include information for applying outbound traffic blocking performed by the second display device to the first display device in the same manner. That is, the third information may include a command or a message for applying the same outbound traffic blocking as in the second display device to the first display device.

In addition, the method 600 for controlling a display device may include operation S620 of adding outbound traffic corresponding to the third information to a block list of the first display device based on the third information. In addition, the method 600 for controlling a display device may include operation S630 of blocking outbound traffic based on the block list of the first display device. That is, the first display device may block outbound traffic in the same manner as the second display device by blocking the outbound traffic corresponding to the third information.

In addition, in operation S640, the first display device may transmit the third information to the third display device. Accordingly, the third display device having received the third information may perform the same operation as the aforementioned operation of the first display device so that at least one other different display device blocks outbound traffic. For convenience of description, although an operation between two display devices has been described, the second display device may perform the same operation as described above with respect to at least one other display device, and at least one other different display device having received the third information may also perform the same operation as the operation of the first display device.

Figure 7:
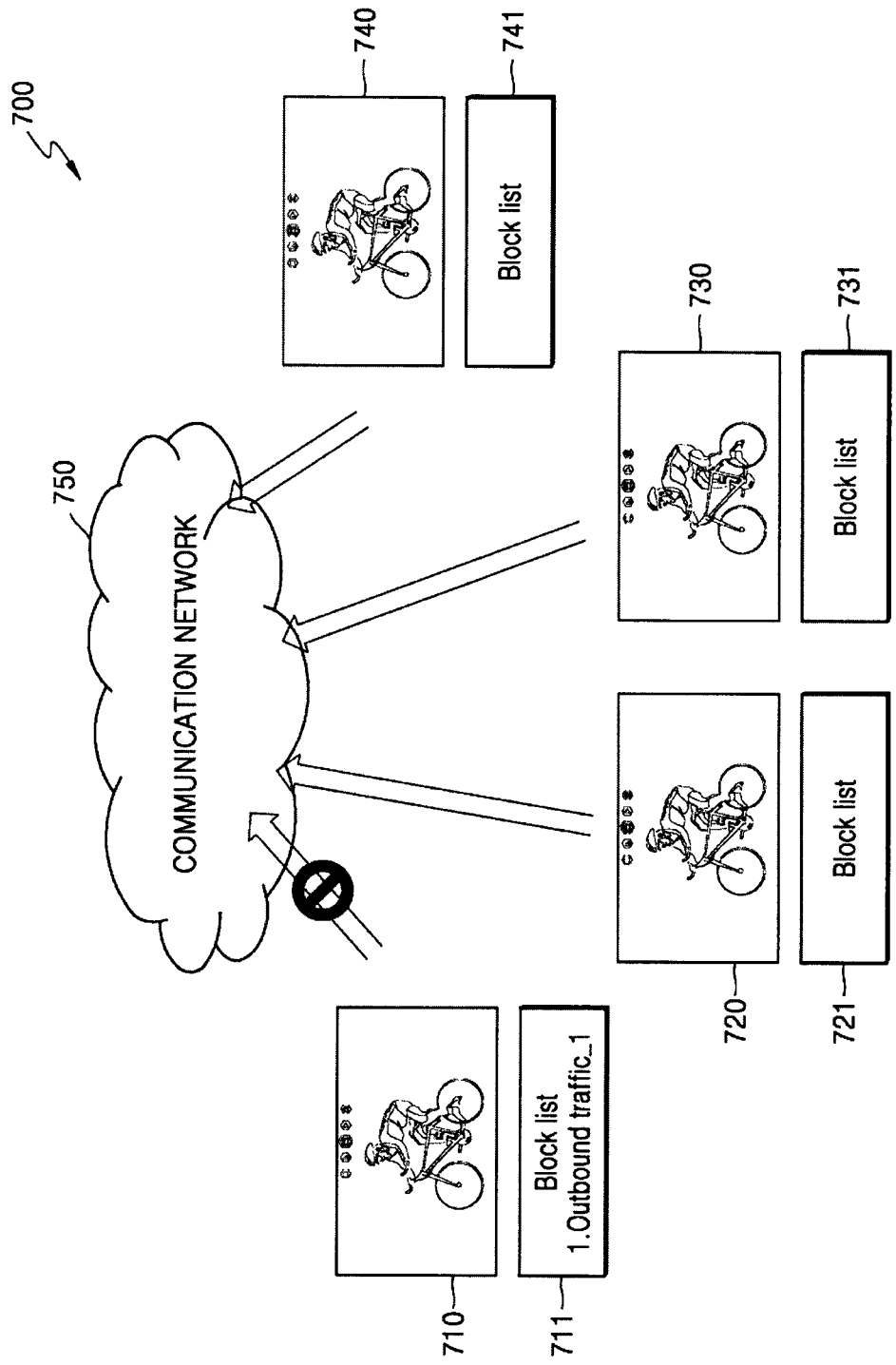
FIG. 7 is a diagram for describing a method for blocking outbound traffic of the disclosed display device.
Figure 8:
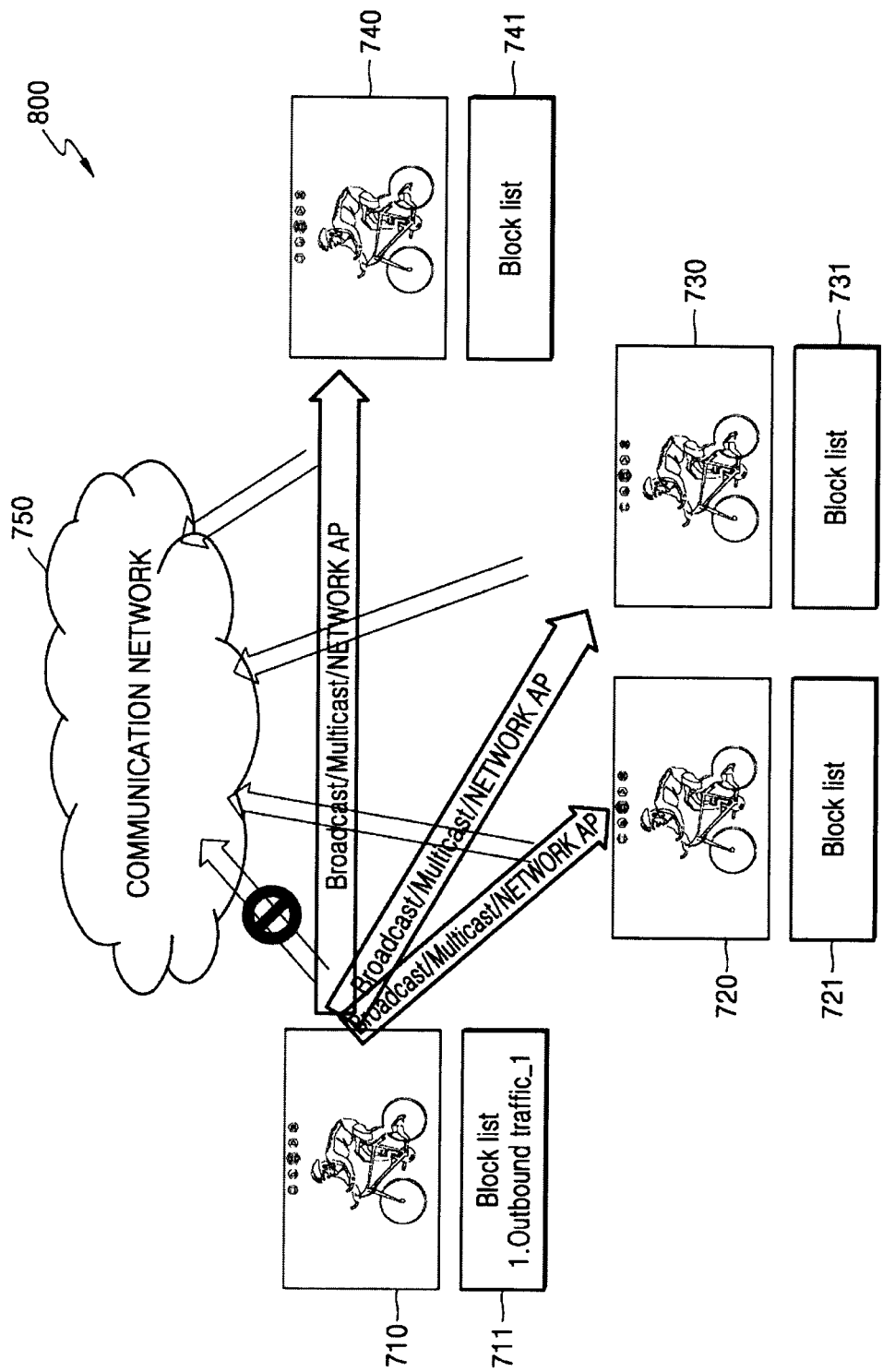
FIG. 8 is another diagram for describing a method for blocking outbound traffic of the disclosed display device.
Figure 9:
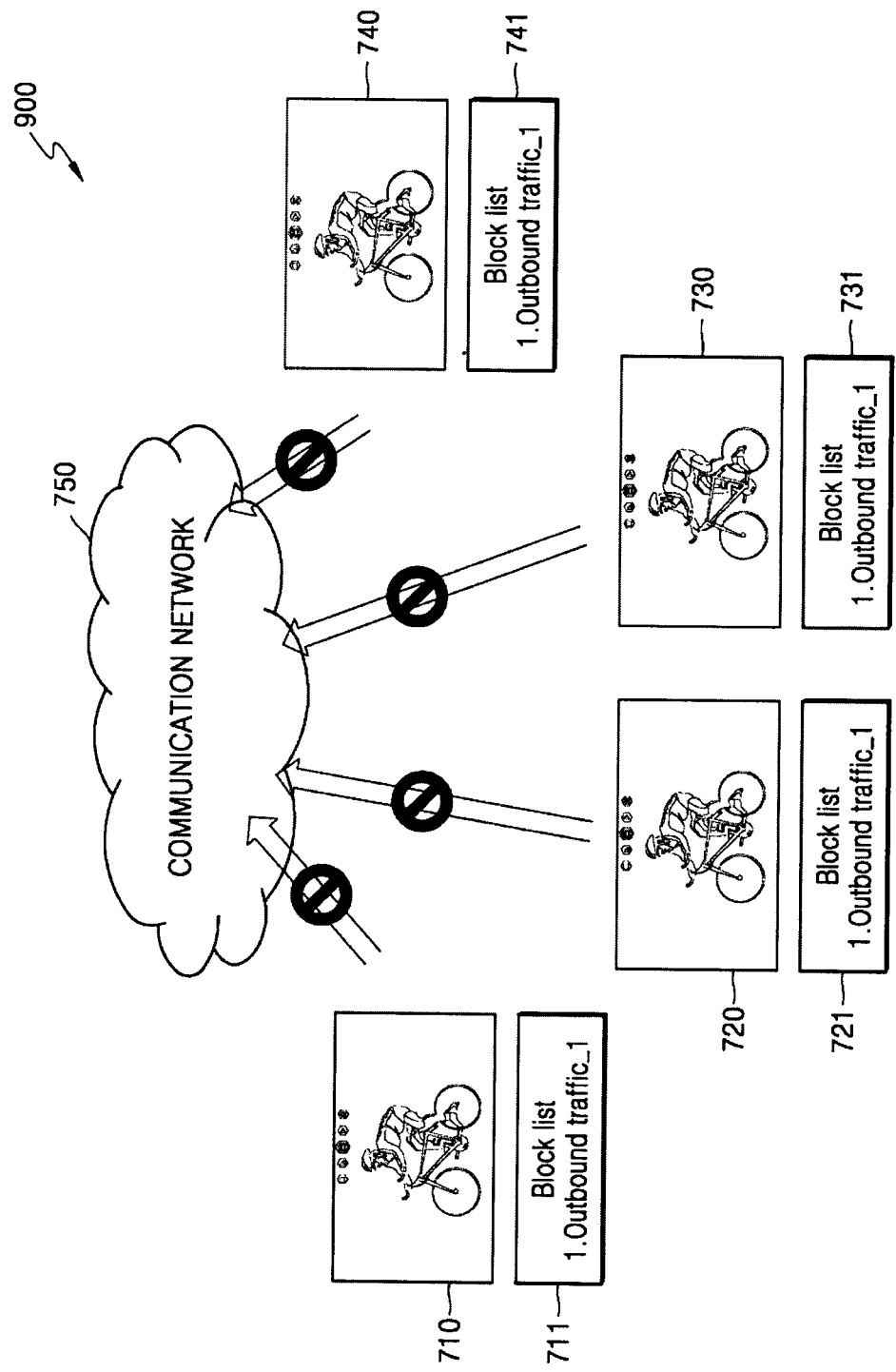
FIG. 9 illustrates display devices of which outbound traffic is blocked, according to a disclosed embodiment.

FIGS. 7 to 9 are diagrams in which outbound traffic of a display device is blocked, according to a disclosed embodiment. Hereinafter, with reference to FIGS. 7 to 9, a method for controlling outbound traffic of a display device will be described. In addition, a description made with reference to FIGS. 1 to 6 is not repeated in a description with reference to FIGS. 7 to 9.

FIGS. 7 to 9 show display devices 710, 720, 730, and 740 existing in a communication network 750. Herein, each of the display devices 710, 720, 730, and 740 may be the video wall 100 or a stand-alone type of independently displaying a single screen image through a single panel as described above. That is, each of a plurality of display devices 710, 720, 730, and 740 may be a display device corresponding to the video wall 100 described with reference to FIG. 1 or an independent display device. In addition, each of the plurality of display devices 710, 720, 730, and 740 may correspond to the display device 300 of FIG. 3.

Referring to FIGS. 7 to 9, the display devices 710, 720, 730, and 740 may be connected to a communication network 750 to, through the communication network 750, receive content for a display or transmit outbound traffic for receiving predetermined information or content.

FIG. 7 shows that outbound traffic to be transmitted from the display device 710 to the communication network 750 is blocked. Referring to FIG. 7, first outbound traffic Outbound traffic_1 may be added to a bock list 711 of the display device 710 to block the first outbound traffic (Outbound traffic_1). An operation of adding outbound traffic to the bock list 711 has been described with reference to FIG. 3, and thus, a description thereof is omitted herein.

In addition, block lists 721, 731, and 741 of a plurality of display devices 720, 730, and 740 do not include the first outbound traffic Outbound traffic_1 yet, and thus, the first outbound traffic Outbound traffic_1 may be continuously transmitted from the plurality of display devices 720, 730, and 740. As such, according to the related art, there is in convenience in that outbound traffic should be blocked with respect to each of the plurality of display devices 710, 720, 730, and 740. Furthermore, according to the related art, there is a disadvantage in that only 'all' outbound traffic to be transmitted from each display device can be blocked. According to an embodiment of the present disclosure, there is an advantage in that only the first outbound traffic Outbound traffic_1 can be selectively blocked, and referring to FIG. 8, by blocking outbound traffic of one display device 710, blocking of the same first outbound traffic Outbound traffic_1 can be applied to at least one other display device 720, 730, and 740, thereby increasing user convenience and efficiency.

FIG. 8 shows a method for transmitting second information for applying outbound traffic corresponding to outbound traffic blocked in the display device 710 to the plurality of display devices 720, 730, and 740.

The display device 710 may use a broadcast scheme or a multicast scheme to transmit the second information to the plurality of display devices 720, 730, and 740.

When the broadcast scheme is used, the display device 710 may transmit the second information to the plurality of display devices 720, 730, and 740 existing in a LAN.

Alternatively, when the multicast scheme is used, the display device 710 may transmit the second information to the plurality of display devices 720, 730, and 740 having subscribed to multicast.

As a method, performed by the display device 710, for transmitting the second information to the plurality of display devices 720, 730, and 740, a method for searching for a display device connected to an AP in a network and transmitting third information to the found display device may be used. For example, by searching a nearby wireless LAN list, display devices connected to a wireless LAN AP may be detected. Therefore, when the plurality of display devices 720, 730, and 740 are included in the wireless LAN list, the display device 710 may transmit the third information to the plurality of display devices 720, 730, and 740.

FIG. 9 shows that outbound traffic corresponding to the second information is blocked by transmitting the second information to the plurality of display devices 720, 730, and 740 in FIG. 8. The plurality of display devices 720, 730, and 740 may block the same first outbound traffic Outbound traffic_1 as the outbound traffic blocked in the display device 710 by adding the first outbound traffic Outbound traffic_1 to the block lists 721, 731, and 741, respectively.

Figure 10:
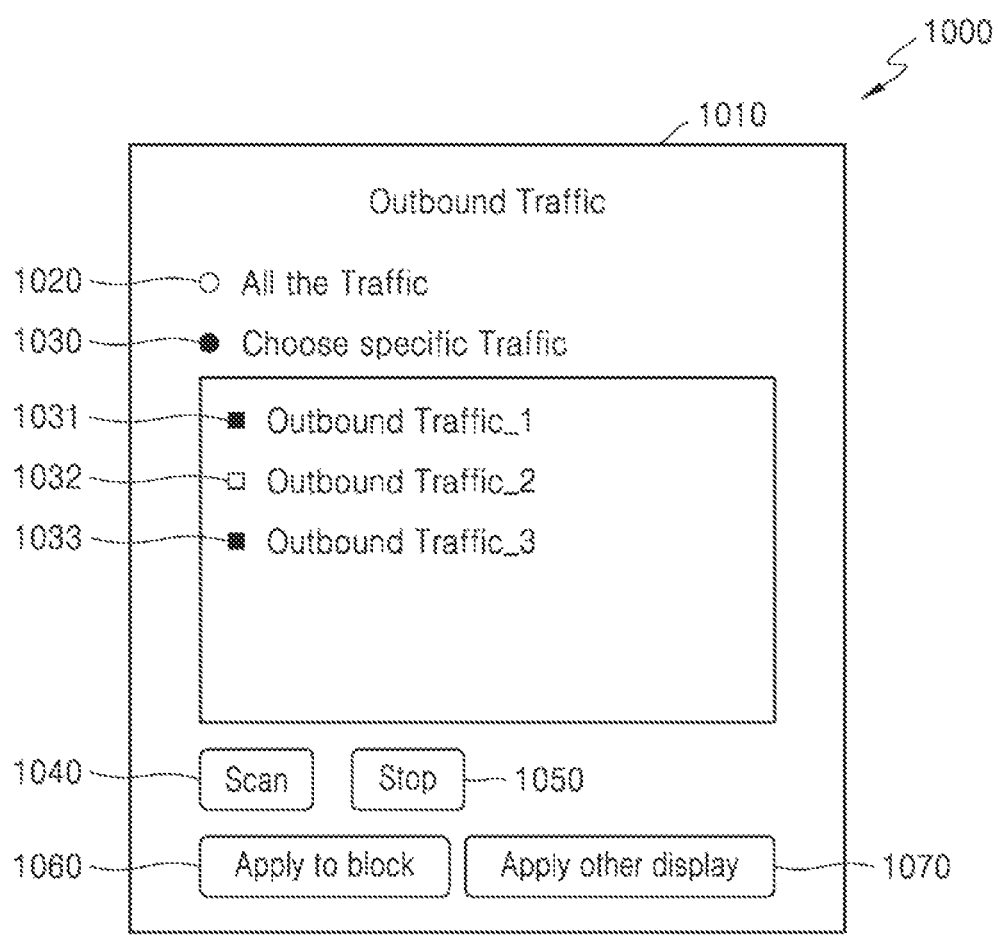
FIG. 10 is an example of a user interface screen image output from a disclosed display device.

FIG. 10 is an example of a UI screen image output from a disclosed display device.

FIG. 10 shows a UI screen image 1000 displayed when a request for blocking predetermined outbound traffic is received from a user.

Referring to FIG. 10, an Outbound Traffic menu 1010 indicates a menu included in the UI screen image 1000 to control outbound traffic.

If a request for blocking all outbound traffic is received from the user, an All the Traffic menu key 1020 may be selected. Accordingly, the display device 300 may control all outbound traffic to be blocked by adding, to a block list, information corresponding to all the outbound traffic to be transmitted from the display device 300.

If a request for blocking predetermined outbound traffic that is at least one of all the outbound traffic is received from the user, a Choose specific Traffic menu key 1030 may be selected. In this case, the user may select outbound traffic to be blocked, through the UI screen image 1000 on which first information is displayed. As described above, the first information may include a list including an IP address, a URL, or a MAC address related to outbound traffic.

For example, referring to FIG. 10, the outbound traffic to be transmitted from the display device 300 may include Outbound Traffic_1 1031, Outbound Traffic_2 1032, and Outbound Traffic_3 1033. Herein, Outbound Traffic_1 1031, Outbound Traffic_2 1032, and Outbound Traffic_3 1033 may include an IP address, a URL, or a MAC address corresponding to each outbound traffic to be transmitted from the display device 300.

In addition, when a Scan menu key 1040 is selected by the user, the control unit 340 may scan outbound traffic to be transmitted from the display device 300. In this case, when a Stop menu key 1050 is selected by the user, the scanning of outbound traffic may stop. For example, when outbound traffic which the user desires to block is already scanned, the user may select the Stop menu key 1050 and select corresponding outbound traffic through the Choose specific Traffic menu key 1030 to block the corresponding outbound traffic.

In addition, the user may select an Apply to block menu key 1060 to apply, to the display device 300, blocking of predetermined outbound traffic selected through the All the Traffic menu key 1020 or the Choose specific Traffic menu key 1030.

In addition, the user may select an Apply other display menu key 1070 to perform the same outbound traffic blocking as in the display device 300 by transmitting second information to at least one other display device.

Figure 11:
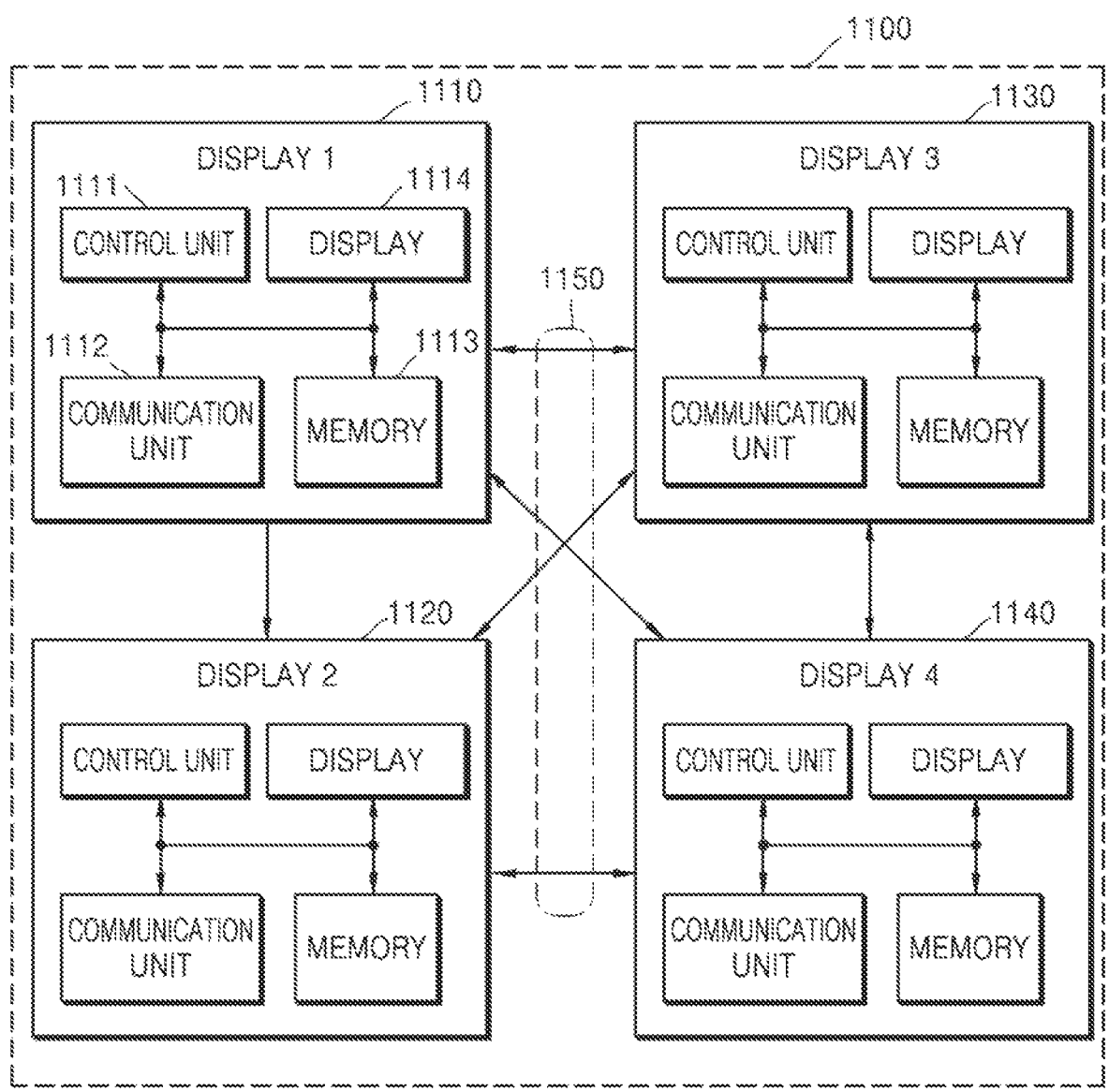
FIG. 11 is a diagram for describing an operation of a single display device, according to a disclosed embodiment.

FIG. 11 is a diagram for describing a method for controlling a single display device, according to a disclosed embodiment.

As described above, for convenience of description, each of the plurality of display devices 101 and 102 is referred to as a 'single display device', and the video wall 100 is referred to as a 'display device'. FIG. 11 shows a plurality of single display devices 1110, 1120, 1130, and 1140 located in a network 1100.

The single display device 1110 may include a control unit 1111, a communication unit 1112, a memory 1113, and a display 1114. Particularly, the control unit 1111, the communication unit 1112, the memory 1113, and the display 1114 in the single display device 1110 may correspond to the control unit 340, the communication unit 320, the memory 330, and the display 310 in the display device 300 shown in FIG. 3, respectively. Although FIG. 11 shows an example in which the display device 1110 includes the same components as the display device 300 shown in FIG. 3, the internal components of the display device 1110 may be the same as the internal components of the display device 400 descried with reference to FIG. 4.

In addition, the plurality of single display devices 1110, 1120, 1130, and 1140 may correspond to single display devices included in the video wall 100 descried with reference to FIG. 1.

The plurality of single display devices 1110, 1120, 1130, and 1140 may perform the same operations as the plurality of display devices 710, 720, 730, and 740 descried with reference to FIGS. 7 to 9 to block outbound traffic. That is, an operation of each of the plurality of single display devices 1110, 1120, 1130, and 1140 to block outbound traffic may correspond to an operation of each of the plurality of display devices 710, 720, 730, and 740.

Particularly, the single display device 1110 may, by the control unit 1111, acquire first information corresponding to outbound traffic to be transmitted from the single display device 1110, block outbound traffic corresponding to second information including at least a portion of the first information, and control outbound traffic of a plurality of single display devices 1120, 1130, and 1140 based on the second information. That is, outbound traffic may be generated even in the plurality of single display devices 1110, 1120, 1130, and 1140 constituting the display device, and to control the outbound traffic, each of the plurality of single display devices 1110, 1120, 1130, and 1140 may perform the same operation as the display device 300.

A display device and a server, according to an embodiment of the present disclosure, may be implemented as computer instructions which may be executed by various computer means, and recorded on a computer-readable medium. In addition, an embodiment of the present disclosure may be formed by a computer-readable recording medium having recorded thereon one or more programs including instructions for executing the aforementioned method of a display device.

The computer-readable medium may include program commands, data files, and data structures, taken alone or in combination. The program commands recorded on the medium may be specially designed and constructed for the present disclosure or may be known to and usable by those of ordinary skill in a field of computer software. Examples of the computer-readable recording medium include magnetic media such as hard discs, floppy discs, or magnetic tapes, optical media such as compact disc-read only memories (CD-ROMs), or digital versatile discs (DVDs), magneto-optical media such as floptical discs, and hardware devices that are specially configured to store and carry out program commands, such as ROMs, RAMs, or flash memories. Examples of the program commands include a high-level language code that may be executed by a computer using an interpreter as well as a machine language code made by a complier.

A device-readable storage medium may be provided in a form of a non-transitory storage medium. Herein, the 'non-transitory storage medium' merely indicates a tangible device and indicates that a signal (e.g., an electromagnetic wave) is not included, and this term does not discriminate a case where data is semipermanently stored in a storage medium from a case where data is temporarily stored in a storage medium. For example, the 'non-transitory storage medium' may include a buffer in which data is temporarily stored.

According to an embodiment, the methods according to various embodiments disclosed in the present document may be provided by being included in a computer program product. The computer program product may be traded as a product between a seller and a purchaser. The computer program product may be distributed in a form of a device-readable storage medium (e.g., a compact disc read only memory (CD-ROM)) or distributed directly or in online through an application store (e.g., PlayStore™) or between two user devices (e.g., smartphones). For the online distribution, at least a portion of the computer program product (e.g., a downloadable application) may be at least temporarily stored in a device-readable storage medium such as a memory of a server of a manufacturer, a server of an application store, or a relay server or be temporarily generated.

Although embodiments have been described in detail, the right scope of the present disclosure is not limited to these embodiments, and various kinds of change and modification of those of ordinary skill in the art using the basic concept of the present disclosure defined in the following claims also belong to the right scope of the present disclosure.

The invention claimed is:

1. A display device comprising:
    a display;
    a communication unit configured to communicate with at least one other display device;
    a memory storing one or more instructions; and
    a control unit comprising at least one processor configured to perform at least one of the one or more instructions,
    wherein the processor is further configured to acquire first information corresponding to outbound traffic to be transmitted from the communication unit, block outbound traffic corresponding to second information including at least a portion of the first information, and display a first user interface for selecting whether to block outbound traffic of the at least one other display device in a same manner as the display device by transmitting the second information to the at least one other display device through the communication unit, and
    wherein the processor is further configured to perform a control so that deblocking is performed by deleting predetermined information corresponding to outbound traffic included in a block list of the display device while the second information cannot be transmitted to the at least one other display device because outbound traffic of the display device is blocked.

2. The display device of claim 1, wherein the first information includes a list including at least one of a destination Internet protocol (IP) address, a uniform resource locator (URL), or a media access control (MAC) address related to outbound traffic to be transmitted when the processor requests predetermined information from at least one external server connected to a network.

3. The display device of claim 2, wherein the processor is further configured to display the list included in the first information and display a second user interface for selecting an item to be blocked from the list included in the first information and generating the second information.

4. The display device of claim 3, wherein the processor is further configured to block at least a portion of outbound traffic to be transmitted from the display device by adding the outbound traffic corresponding to the second information to the block list, and wherein the block list includes at least one of a destination IP, a URL, or a MAC address related to the outbound traffic corresponding to the second information.

5. The display device of claim 1, wherein the processor is further configured to transmit the second information to the at least one other display device by using at least one of a broadcast scheme, a multicast scheme, or a scheme of communicating with the at least one other display device connected to an access point (AP) in a network.

6. The display device of claim 1, wherein the processor is further configured to, when third information for blocking outbound traffic of the display device in a same manner as the at least one other display device is received, add outbound traffic corresponding to the third information to the block list of the display device and control outbound traffic to be blocked based on the block list.

7. The display device of claim 6, wherein the processor is further configured to control the third information to be transmitted to at least one other different display device.

8. A method for controlling a display device capable of communicating with at least one other display device connected to a network, the method comprising:

acquiring first information corresponding to outbound traffic to be transmitted from a communication unit;

blocking outbound traffic corresponding to second information including at least a portion of the first information;

blocking outbound traffic of the at least one other display device in a same manner as the display device by transmitting the second information to the at least one other display device through the communication unit; and deblocking by deleting predetermined information corresponding to outbound traffic included in a block list of the display device while the second information cannot be transmitted to the at least one other display device because outbound traffic of the display device is blocked.

9. The method of claim 8, wherein the first information includes a list including at least one of a destination Internet protocol (IP) address, a uniform resource locator (URL), or a media access control (MAC) address related to outbound traffic to be transmitted when requesting predetermined information from at least one external server connected to the network.

10. The method of claim 9, wherein the blocking comprises displaying the list included in the first information, and displaying a second user interface for selecting an item to be blocked from the list included in the first information and generating the second information.

11. The method of claim 10, wherein the blocking comprises blocking at least a portion of outbound traffic to be transmitted from the display device by adding the outbound traffic corresponding to the second information to the block list, and wherein the block list includes at least one of a destination IP, a URL, or a MAC address related to the outbound traffic corresponding to the second information.

12. The method of claim 8, wherein the blocking comprises transmitting the second information to the at least one other display device by using at least one of a broadcast scheme, a multicast scheme, or a scheme of communicating with the at least one other display device connected to an access point (AP) in the network.

13. A computer program product comprising a recording medium having stored therein a program for implementing the method of claim 8.

* * * * *